Sept. 2, 1952 A. C. WINTERHALTER 2,609,438
SEISMIC EXPLORATION APPARATUS
Filed Jan. 24, 1947 3 Sheets-Sheet 1

INVENTOR.
Alfred C. Winterhalter
BY
Busser & Harding
ATTORNEYS

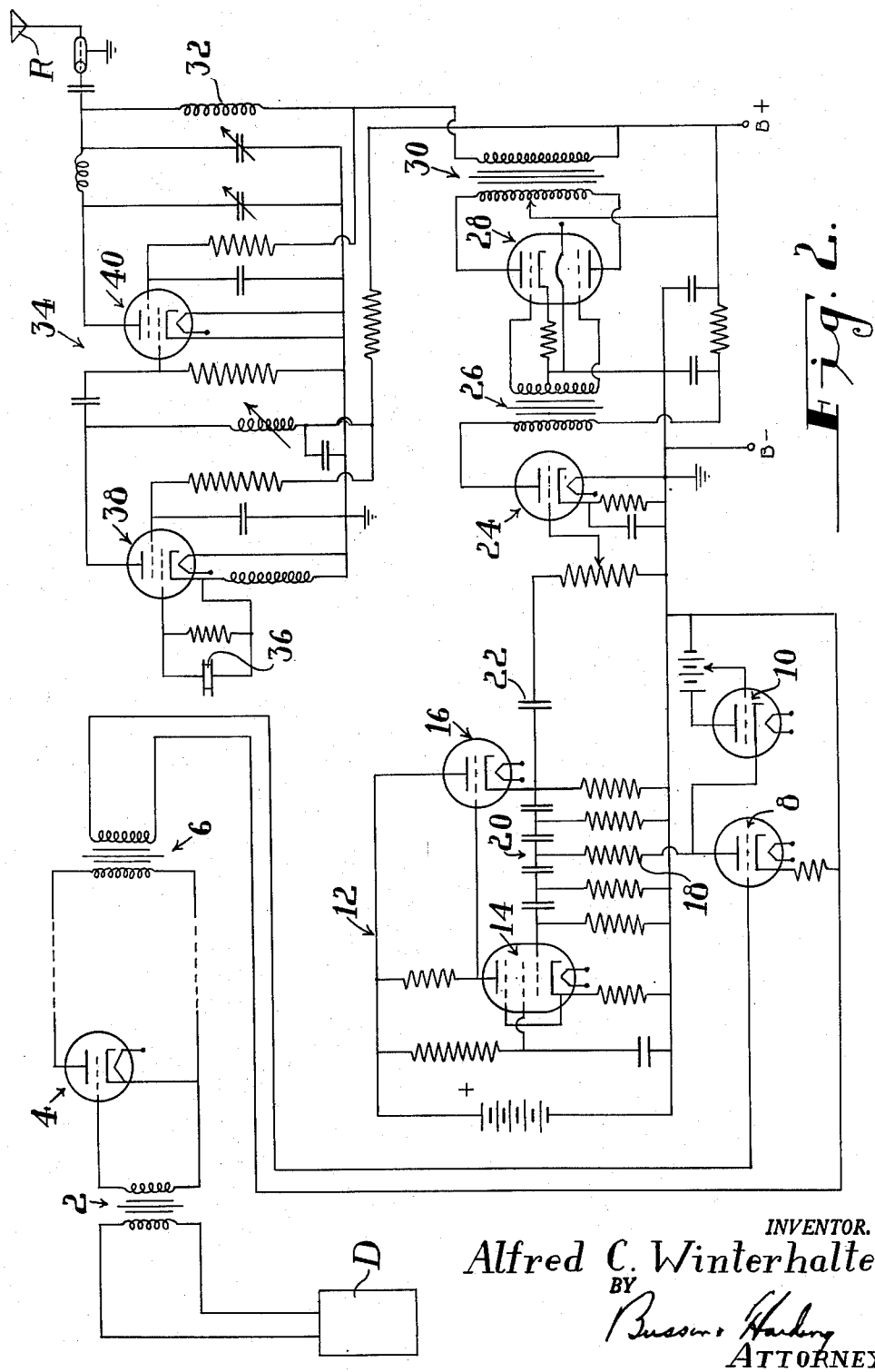

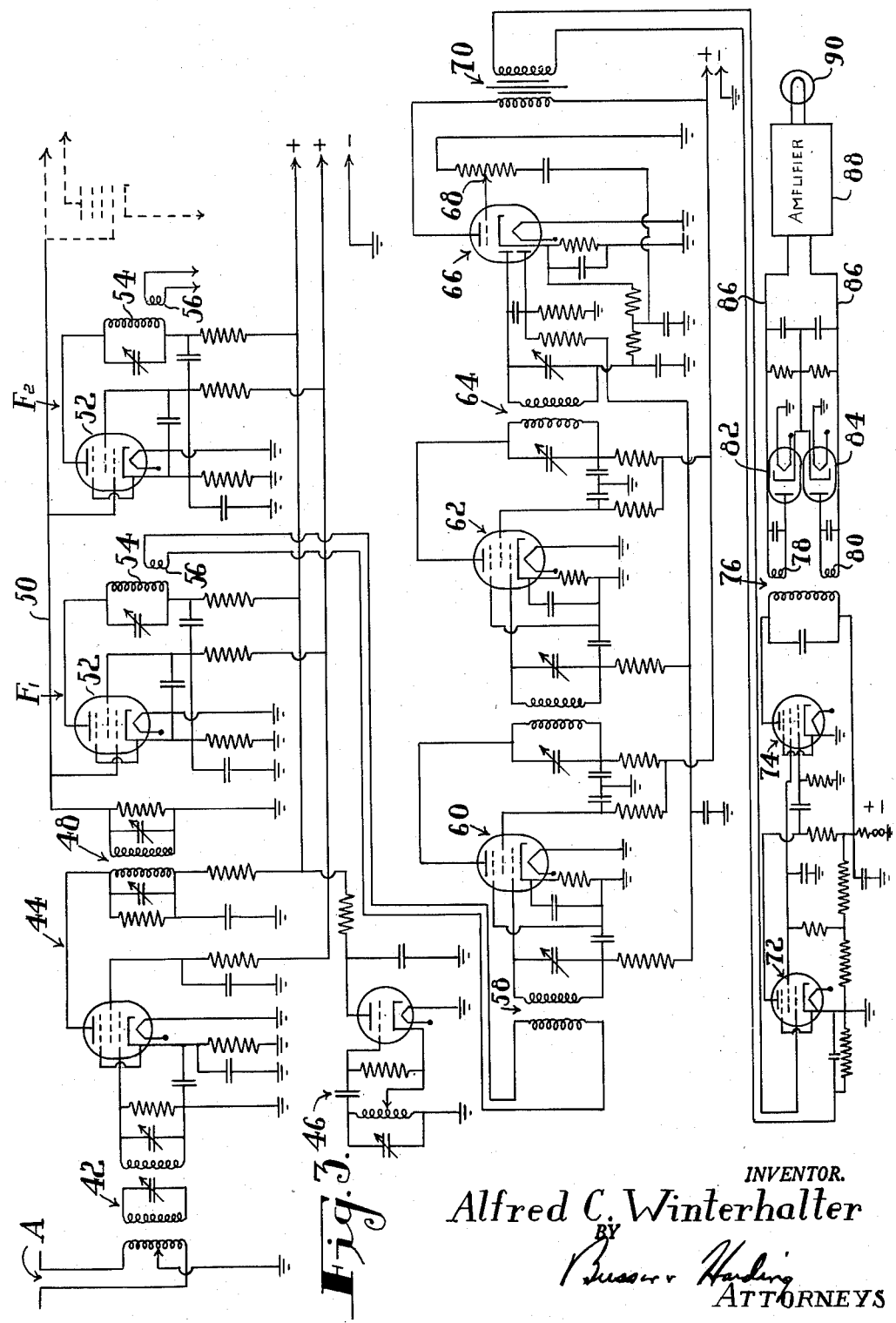

Patented Sept. 2, 1952

2,609,438

UNITED STATES PATENT OFFICE 2,609,438

SEISMIC EXPLORATION APPARATUS

Alfred C. Winterhalter, Beaumont, Tex., assignor to Sun Oil Company, Philadelphia, Pa., a corporation of New Jersey Application January 24, 1947, Serial No. 724,057

3 Claims. (Cl. 177—352)

This invention relates to seismic exploration methods and apparatus and has particular reference to seismic exploration carried out over water or other areas precluding the convenient handling of seismic detectors and detector lines.

As ordinarily carried out on land seismographic exploration involves interconnections of the various parts of the apparatus by cables, or, when radio apparatus is used in part, attendance of operators at the detectors. It will be evident that the conventional methods used on land in this work are not applicable to exploration over deep water because of the impracticability of running connecting lines from a series of detectors to a central recording unit or the alternative impracticability of having a competent instrument operator and boat at each detector location, using a single channel recording instrument at each such location.

It is an object of the present invention to provide a method and apparatus for exploration adapted to water covered areas or similar areas such as in swamp land or difficult terrain as, for example jungles, where conventional operations are impractical. In fact, as will be evident, the invention is applicable to seismic exploration over ordinary terrain involving a saving in physical operations by elimination of connecting cables between various parts of the apparatus.

Briefly stated the invention involves the location of radio transmitters at the individual detector stations with provision of a single receiving station which may be adjacent to the shot point or elsewhere and which, in simple fashion, is capable of segregating and simultaneously recording the various signals from the transmitters.

Secondary objects of the invention relate to the provision of methods and means for securing the desired results in simple reliable fashion with a minimum of apparatus. These and other objects of the invention will become apparent from the following description read in conjunction with the accompanying drawings in which:

Figure 2 is a diagram illustrating details of the signal transmitting apparatus associated with individual detectors; and Figure 3 is a diagram illustrating details of receiving and recording apparatus.

Figure 1:
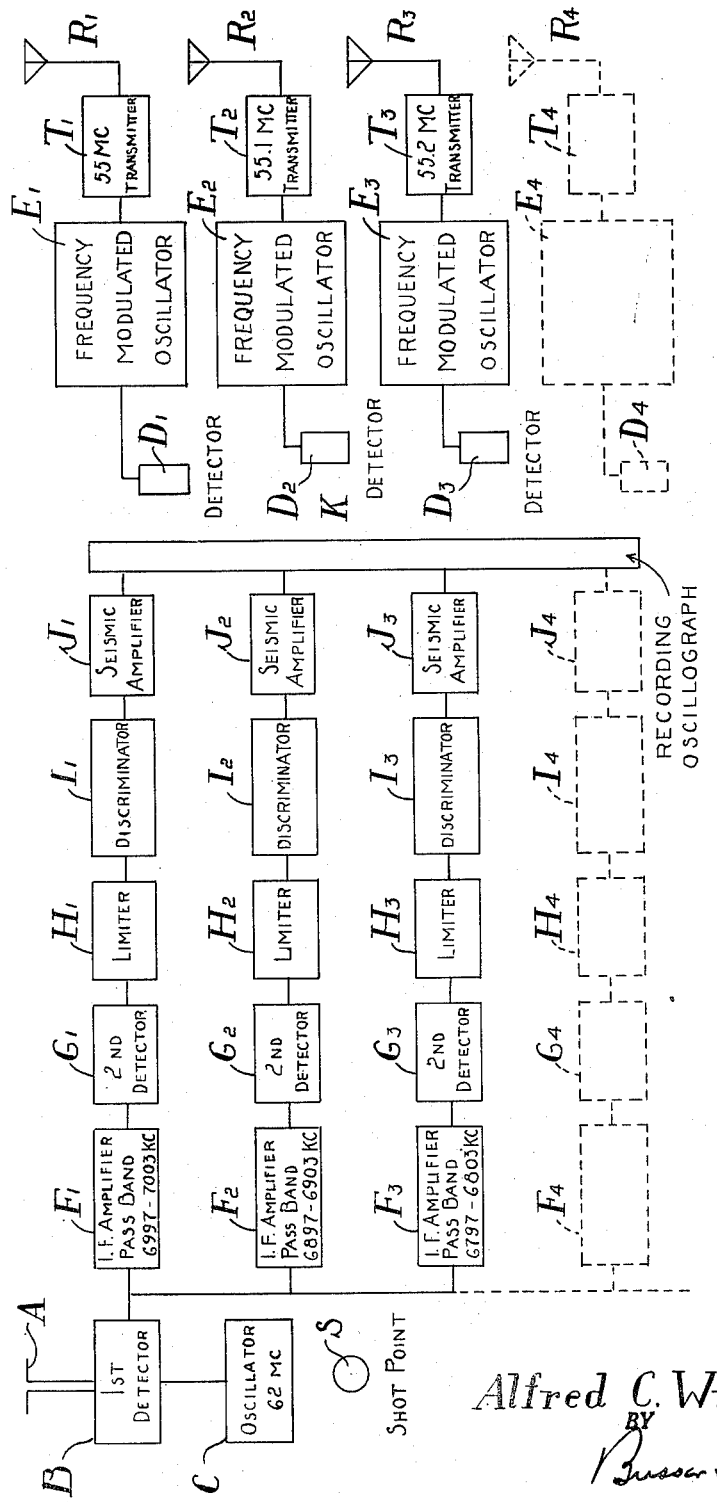
Figure 1 is a block diagram illustrating the elements involved in seismic exploration in accordance with the invention.

Referring first to Figure 1, a shot point is indicated at S. Assuming work which is entirely over a water covered area the shot might be fired underwater to give rise to disturbances which are picked up by a series of detectors indicated at D. These detectors may be of any conventional type suitable for the particular exploration which is being carried out. As will be evident the exploration may be either of the refraction or reflection type and the detectors may be of the various known types which may be selectively responsive to waves arriving from different directions, frequency selective, or the like. In any case, the detectors may be submerged in the water supported by floats, or may be located on the bottom connected to floats, which floats may carry transmitting apparatus. Adjacent to the shot point, or in any other convenient location, there is arranged the receiver which may be wired to the shot for the purpose of indicating the instant the shot is fired. The receiving and recording apparatus may, for example, be carried in a boat containing the firing mechanism and the operating personnel. As will become evident from the nature of the apparatus employed at the detector stations, the floats referred to above may be placed and thereafter remain unattended while a series of shots may be fired at various points to secure a series of records. In accordance with this invention each detector D is associated with a frequency modulated oscillator E giving rise to an output which is frequency modulated by the signals picked up by the detectors. The output from each apparatus E is used for amplitude modulation of a transmitter T which radiates its output from an individual antenna R. As an example of the detector arrangement, each apparatus E may comprise an oscillator having a base frequency of 2500 cycles per second. Satisfactory frequency modulation may involve a deviation giving rise to an output frequency spectrum with significant frequencies from 2000 to 3000 cycles per second.

The various transmitters $T_1$, $T_2$, etc. associated with the detectors $D_1$, $D_2$, etc. and the apparatus $E_1$, $E_2$, etc. have different carrier frequencies which, for purposes of simplicity of discussion, may be assumed to be 55 megacycles for transmitter $T_1$, 55.1 megacycles for transmitter $T_2$, 55.2 megacycles for transmitter $T_3$, etc. Considering these figures the band radiated from $R_1$ will range from 54,997 to 55,003 kilocycles, that from $R_2$ from 55,097 to 55,103 kilocycles, that from $R_3$ from 55,197 to 55,203 kilocycles, etc. Each of these bands carries the signals from its corresponding detector. The bands, while they do not overlap, are sufficiently close that for a quite large number of detectors the radiated signals may be easily picked up by a single receiver.

The receiver comprises an antenna A feeding a first detector B which is also fed from an oscillator which we may assume to have a frequency of 62 megacycles. A series of intermediate frequency bands are accordingly produced which feed separate channels corresponding to the various detectors in accordance with the subscripts indicated in Figure 1. Each of these bands comprises an intermediate frequency amplifier F, a second detector G which gives rise to the original frequency modulated signals, a limiter H, a discriminator I and a seismic amplifier J. From the seismic amplifiers J there are controlled the various recording elements of a multiple recording oscillograph K of conventional type, which oscillograph may also form a record of shot instant through conventional apparatus connected to the charge or to the firing apparatus as well as a timing wave which may be supplied in conventional fashion by a tuning fork or other oscillator.

The several intermediate frequency amplifiers F handle individual bands which, adhering to the figures previously given, would range for $F_1$ from 6,997 to 7,003 kilocycles, for $F_2$ from 6,897 to 6903 kilocycles, for $F_3$ from 6797 to 6,803 kilocycles, etc. As will be evident these bands are sufficiently spaced to be easily separated by filtering.

As a general picture of the apparatus it will be evident that by the arrangement indicated the individual detector signals may be transmitted from the detector stations to a single receiver and are separated and separately recorded on different channels of the oscillograph. The recording oscillograph may be replaced, if desired by a wire recorder, a phonograph recorder or any other type of recording receiver which may be desired. There will now be discussed typical apparatus constituting the elements indicated in Figure 1.

Figure 2 illustrates a suitable form of transmitter. A seismic detector D feeds its signals through a transformer 2 to an amplifier 4 which is conventionalized as a single vacuum tube though, of course, ordinarily a multiple stage amplifier will be here used of the type conventional in the amplification of low frequency seismic signals which may involve, for example, conventional automatic volume control, filtering, time delay, or the like. The output of the amplifier is transmitted through the transformer 6 to tubes 8 and 10 of a frequency modulated oscillator operating, for example, at 2500 cycles with a frequency deviation as described above. This frequency modulated oscillator may be, in general, similar to that described in the article "Frequency Modulation of Resistance-Capacitance Oscillators" by Mauriz Artz in the proceedings of the I. R. E., July 1944. This oscillator indicated generally at 12 is also described in my application Serial No. 656,803, filed March 25, 1946. Tubes 14 and 16 with suitable interconnections including a network shown at 20 are connected in circuit as indicated with the tubes 8 and 10 through a resistance 18 and the oscillator delivers its output through the condenser 22 to an amplifier tube 24 which, through a transformer 26 drives a modulator tube 28 connected through a transformer 30 and a choke 32 to a transmitter in such fashion as to provide amplitude modulation of the transmitter output. The transmitter 34 comprises an oscillator tube 38 controlled by a crystal 36 driving an amplifier tube 40. The output from the transmitter feeds the antenna R which may be of conventional quarter or half wave type commonly used with amplitude modulated transmitters. It will be evident that the various parts of this apparatus are individually conventional and are chosen in accordance with conventional good practice in the radio arts. The radiated signal, however, is of somewhat special character, consisting of a high frequency carrier, amplitude modulated by a frequency modulated signal, the modulation of which is by the detector signal.

The receiver used in accordance with the invention is illustrated in Figure 3. The antenna A picks up the signals from all of the transmitters and is coupled through broad band transformer coupling indicated at 42 to the first detector indicated at 44. This coupling to the antenna may be of the broad band type such as is used in television receiver circuits and is adjusted to pass all of the radio frequency carriers and side band frequencies of the transmitters. The antenna itself should be of the broad band type covering frequencies of all of the transmitters. An oscillator 46 operating, for example as indicated at 62 megacycles, beats with the incoming signals to produce intermediate frequency bands which are fed through the coupling circuits 48 which are of broad band pass type tuned to pass all of the intermediate frequencies carrying the original signals.

To the output of the coupling arrangement 48 there are connected in parallel, by connection to the line 50, a series of coupling tubes 52, the plate circuits of which are individually tuned by the resonant elements 54 to pass the individual intermediate frequency bands corresponding to the various detectors. Each of the plate circuits is coupled as indicated at 56 to an individual channel. The remaining portion of Figure 3 indicates only the elements of one of these channels, the others being duplicates of the one to be described. It will be assumed for simplicity of consideration that the channel which is described is the one which receives the signal band from 6,997 to 7,003 kilocycles.

Amplification of this band is effected through the tubes 60 and 62 arranged in conventional amplifying circuits including the input transformer 58 and the output transformer 64. Tuning is provided to pass the desired band with suppression of the other bands with the result that substantially only the desired band is fed through the transformer 64 to the second detector and amplifier comprising the tube 66 of triode-twin diode type arranged in a conventional circuit. From this second detector and amplifier, the output of which is regulated by the potentiometer 68, there is fed through the transformer 70 the frequency modulated signals having a band extending from 2000 to 3000 cycles. The transformer feeds a pair of limiter tubes 72 and 74 arranged conventionally for this purpose, the output of the second tube being delivered to the primary of a transformer 76, the two secondaries 78 and 80 of which are connected to diodes 82 and 84, respectively, to provide a discriminator circuit of conventional nature. The secondaries 78 and 80 are tuned by condensers slightly above and slightly below the average frequency, i. e., 2500 cycles. The output of the discriminator consists of the original signals corresponding to the band under consideration and these signals are fed through the lines 86 to a conventional low frequency amplifier 88 which, in turn, operates the corresponding oscillograph element 90 or another recording device for the production of a record of the detected signals.

As will be evident from my application Serial Number 656,803, referred to above, the various frequency modulated oscillators $E_1$, $E_2$, etc. might well operate at different base frequencies rather than at the same base frequency so that the second detector outputs, at transformers 70, for the various channels would consist of frequency modulated signals having different base frequencies. In such case mixing of these outputs may be provided for simultaneous recording on magnetic wire or tape or equivalent recording element. The resulting record in such case could be sent to a central laboratory for analysis in accordance with the practices described in my said prior application. If, however, recording in the field of the seismic signals is done, it is more economical to have all frequency modulation at the same base frequency since, as will be evident, the apparatus may then contain many duplicate parts.

It will be clear from the foregoing that numerous variations may be adopted in practicing the invention with attainment of the broad object of providing unattended detector stations with radio transmission of the detected signals to a central recording apparatus without possible confusion of the signals, and in particular by the use of a single receiver for all of the signals, so that their original time relationships are preserved. It will be noted that slight relative phase shifts in the high frequency carriers will have only negligible effects in phase displacements of the seismic signals.

What I claim and desire to protect by Letters Patent is:

1. Seismic prospecting apparatus comprising a series of seismic detectors, frequency modulated oscillators individual to the detectors for producing low frequency signals frequency modulated by the seismic signals from the detectors, said low frequency signals all being of substantially the same frequency, high frequency radio transmitters producing high frequency signals modulated by said low frequency signals for transmitting said frequency modulated signals, said transmitters operating at different carrier frequencies, a receiver for signals transmitted from said transmitter, and means controlled by said receiver for differentiating and recording the detected seismic signals.

2. Seismic prospecting apparatus comprising a series of seismic detectors, frequency modulated oscillators individual to the detectors for producing low frequency signals frequency modulated by the seismic signals from the detectors, said low frequency signals all being of substantially the same frequency, radio transmitters individual to the detectors producing high frequency signals modulated by said frequency modulated signals to transmit high frequency signals, said transmitters operating at different carrier frequencies, a receiver for the radio signals transmitted by all of said transmitters, means for producing intermediate frequency signals individual to said detectors, means for separating said intermediate frequency signals, means for demodulating the intermediate frequency signals to provide signals corresponding to the original frequency modulated signals, means for demodulating the last mentioned frequency modulated signals to recover said seismic signals, and means for recording the last mentioned signals.

3. Seismic prospecting apparatus comprising a series of seismic detectors, frequency modulated oscillators individual to the detectors for producing low frequency signals frequency modulated by the seismic signals from the detectors, said low frequency signals all being of substantially the same frequency, radio transmitters individual to the detectors producing high frequency signals amplitude modulated by said frequency modulated signals to transmit high frequency signals, said transmitters operating at different carrier frequencies, a receiver for the radio signals transmitted by all of said transmitters, means for producing intermediate frequency signals individual to said detectors, means for separating said intermediate frequency signals, means for demodulating the intermediate frequency signals to provide signals corresponding to the original frequency modulated signals, means for demodulating the last mentioned frequency modulated signals to recover said seismic signals, and means for recording the last mentioned signals.

ALFRED C. WINTERHALTER.

REFERENCES CITED

The following references are of record in the file of this patent:

UNITED STATES PATENTS

| Number | Name | Date |
| --- | --- | --- |
| 2,164,745 | Kentner | July 4, 1939 |
| 2,237,522 | Clark | Apr. 8, 1941 |
| 2,265,513 | Burg | Dec. 9, 1941 |
| 2,291,779 | Welty | Aug. 4, 1942 |
| 2,378,395 | Dickson et al. | June 19, 1945 |
| 2,379,052 | Weaver | June 26, 1945 |
| 2,407,199 | Wolff | Sept. 3, 1946 |
| 2,407,308 | Lorenzen | Sept. 10, 1946 |
| 2,433,343 | Chatterjea et al. | Dec. 30, 1947 |